(12) United States Patent
Lindner et al.

(10) Patent No.: US 10,714,991 B2
(45) Date of Patent: Jul. 14, 2020

(54) CLAW POLE TYPE MOTOR

(71) Applicant: PIERBURG PUMP TECHNOLOGY GMBH, Neuss (DE)

(72) Inventors: Enrico Lindner, Penig (DE); Mathias Zill, Nossen (DE); Toni Henke, Drebach (DE)

(73) Assignee: PIERBURG PUMP TECHNOLOGY GMBH, Neuss (DE)

( * ) Notice: Subject to any disclaimer, the term of this patent is extended or adjusted under 35 U.S.C. 154(b) by 0 days.

(21) Appl. No.: 16/311,685

(22) PCT Filed: Jul. 6, 2016

(86) PCT No.: PCT/EP2016/065984
§ 371 (c)(1),
(2) Date: Dec. 20, 2018

(87) PCT Pub. No.: WO2018/006954
PCT Pub. Date: Jan. 11, 2018

(65) Prior Publication Data
US 2019/0334392 A1 Oct. 31, 2019

(51) Int. Cl.
*H02K 1/14* (2006.01)
*H02K 21/12* (2006.01)

(52) U.S. Cl.
CPC .......... *H02K 1/145* (2013.01); *H02K 21/125* (2013.01); *H02K 2201/12* (2013.01)

(58) Field of Classification Search
CPC .. H02K 1/18; H02K 3/12; H02K 7/20; H02K 37/14; H02K 21/14; H02K 15/12

USPC ......... 310/12.21, 49.01, 49.33, 49.34, 49.44, 310/49.45, 156.69, 216.022, 40 MM, 310/49.13, 216.026, 254.1
See application file for complete search history.

(56) References Cited

U.S. PATENT DOCUMENTS

2004/0100161 A1    5/2004  Matsushita et al.
2005/0218730 A1   10/2005  Matsushita
(Continued)

FOREIGN PATENT DOCUMENTS

CN         1630975 A      6/2005
CN       202856579 U      4/2013
(Continued)

OTHER PUBLICATIONS

Machine Translation WO03069766 (Year: 2003).*
Machine Translation EP1601080 (Year: 2005).*

*Primary Examiner* — Jose A Gonzalez Quinones
(74) *Attorney, Agent, or Firm* — Norman B. Thot

(57) ABSTRACT

An automotive single-phase electrical motor of a claw pole type includes a rotating motor rotor which rotates around a rotating axis, a stator defined by a pair of annular stator bodies, and a stator coil arrangement which magnetizes the stator bodies. The stator bodies includes a first stator body having a radial arm and at least two magnetic claws, and a second stator body having a radial arm and at least two magnetic claws. The at least two magnetic claws of the first stator body mesh with the at least two magnetic claws of the second stator body so that the stator bodies mate with each other. The stator coil arrangement is provided as a satellite of the stator bodies. The radial arm of the first stator body and the radial arm of the second stator body are magnetically connected to each other at the stator coil arrangement.

10 Claims, 2 Drawing Sheets

(56) References Cited

U.S. PATENT DOCUMENTS

| | | | |
|---|---|---|---|
| 2007/0278894 A1 | 12/2007 | Masaki et al. | |
| 2010/0066201 A1* | 3/2010 | Engel | H02K 1/145 310/257 |
| 2012/0038231 A1* | 2/2012 | Oda | H02K 7/116 310/90 |
| 2014/0028134 A1 | 1/2014 | Yamamoto et al. | |

FOREIGN PATENT DOCUMENTS

| | | | |
|---|---|---|---|
| CN | 103493346 A | 1/2014 | |
| DE | 1 096 482 B | 1/1961 | |
| DE | 10 2006 034 567 A1 | 2/2007 | |
| EP | 1 414 142 A1 | 4/2004 | |
| EP | 1 482 626 A1 | 12/2004 | |
| EP | 1601080 A1 * | 11/2005 | H02K 3/524 |
| JP | 1-101524 A | 4/1989 | |
| JP | 1-136553 A | 5/1989 | |
| JP | 09-191615 A | 7/1997 | |
| JP | 2003-244923 A | 8/2003 | |
| JP | 2008-263738 A | 10/2008 | |
| JP | 2013-183511 A | 9/2013 | |
| JP | 2013-201811 A | 10/2013 | |
| WO | WO-03069766 A1 * | 8/2003 | H02K 37/14 |

* cited by examiner

CLAW POLE TYPE MOTOR

CROSS REFERENCE TO PRIOR APPLICATIONS

This application is a U.S. National Phase application under 35 U.S.C. § 371 of International Application No. PCT/EP2016/065984, filed on Jul. 6, 2016. The International Application was published in English on Jan. 11, 2018 as WO 2018/006954 A1 under PCT Article 21(2).

FIELD

The present invention relates to an automotive single-phase electrical motor of the claw pole type.

BACKGROUND

The present invention in particular relates to an automotive single-phase electric motor for driving secondary components or devices of an automobile. Such components or devices could be, for example, auxiliary units, actuators or pumps. The automotive electric motor according to the present invention is accordingly not an engine of the automobile for driving the vehicle. The automotive electrical motor comprises a motor rotor rotating around a rotation axis and a stator defined by a mating pair of annular stator bodies. Each body is provided with at least two magnetic pole claws meshing with the claws of the other body. The electrical motor further comprises a stator coil arrangement for magnetizing the stator bodies.

A claw pole type motor of this type is described in US 2007/0278894 A1. The claw pole type motor comprises a motor rotor which is rotatably provided in a motor stator. The stator is defined by two stator bodies which are provided coaxially to a motor rotor axis. Each stator body provides a plurality of pole claws extending in an axial direction. A stator coil is arranged axially between the stator bodies, thereby surrounding the claws of the stator bodies.

The dimension of the stator coil depends on the stator dimensions, in particular on the stator diameter. Different stator coils are accordingly required for different types of electric motors having different stator diameters. Many different stator coils must thus be manufactured and stored. This fact increases the manufacturing costs of the electric motor.

SUMMARY

An aspect of the present invention is to provide an automotive single-phase electrical motor of the claw pole type which can be manufactured more economically.

In an embodiment, the present invention provides an automotive single-phase electrical motor of a claw pole type which includes a motor rotor configured to rotate around a rotating axis, a stator defined by a pair of annular stator bodies, and a stator coil arrangement configured to magnetize the pair of annular stator bodies. The pair of annular stator bodies comprises a first stator body which comprises a radial arm and at least two magnetic claws, and a second stator body which comprises a radial arm and at least two magnetic claws. The at least two magnetic claws of the first stator body are configured to mesh with the at least two magnetic claws of the second stator body so that the pair of annular stator bodies mate with each other. The stator coil arrangement is provided as a satellite of the pair of annular stator bodies. The radial arm of the first stator body and the radial arm of the second stator body are magnetically connected to each other at the stator coil arrangement.

BRIEF DESCRIPTION OF THE DRAWINGS

The present invention is described in greater detail below on the basis of embodiments and of the drawings in which.

DETAILED DESCRIPTION

Figure 1:
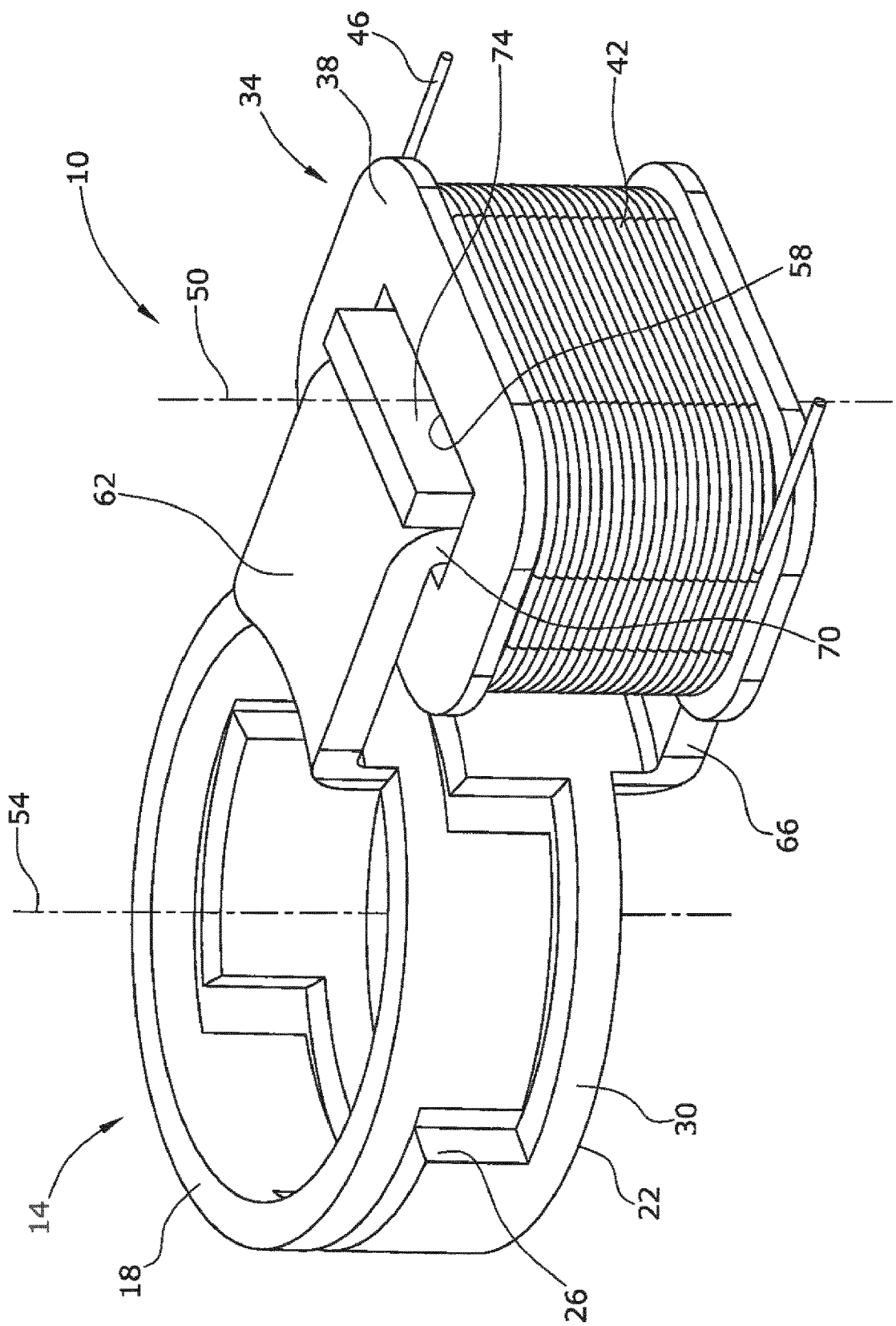
FIG. 1 shows a perspective view of an automotive single-phase electrical motor (without motor rotor) of the claw pole type according to the present invention.

According to the present invention, the stator coil arrangement is provided as a satellite, and radial arms of the stator bodies are magnetically connected to each other at or within the stator coil arrangement. The term "satellite" according to the present invention means that the stator coil arrangement is not arranged coaxially with the rotor but is arranged at an outer radial vicinity of the stator bodies. The stator bodies are therefore magnetically connected to the stator coil by radial arms. The stator coil arrangement diameter is therefore not dependent on the diameter of the stator bodies. The design and the dimensions of the stator coil arrangement can accordingly be provided independently of the stator bodies dimensions. The present invention provides that one or only a few types of stator coil arrangements are necessary for different stator bodies so that standardized stator coil arrangements can be used, thereby reducing the total manufacturing costs of the automotive electrical motor. The stator bodies can also be provided to be more compact in a radial direction because the stator coil is not arranged around the claws. The position of the coil arrangement can be variably defined. The electric motor can accordingly easily be adapted to an existing mounting space in the automobile. The inventive features of the present invention also have the effect that the size of the coil arrangement is independent of the stator bodies so that the coil size can be selected only in accordance with the power requirements.

In an embodiment of the present invention, the motor rotor can, for example, be permanently magnetized. An electrical motor comprising a permanently magnetized rotor has a higher efficiency.

In an embodiment of the present invention, the stator bodies can, for example, be stamped-bent-sheet-metal parts. Stator bodies manufactured by stamping and bending a metal sheet are produced cost-effectively.

In an embodiment of the present invention, the circumference of the stator coil arrangement can, for example, be smaller than the total circumference of the stator body claws. The outer circumference of the stator coil arrangement is defined by the length of one outer coil winding. The circumference of the stator body claws is defined as the outer circumference of a cylinder plane defined by all pole claws. The stator coil dimensions are designed as compact as electrically possible. As a consequence, the total length of the coil wire is reduced, the electrical coil resistance is reduced, and the manufacturing costs can be decreased, whereas the electric efficiency of the electric motor can be increased.

In an embodiment of the present invention, the stator coil arrangement can, for example, comprise several parallel coil units. A parallel coil unit according to the present invention is an additional coil unit having the same phase but which acts electrically parallel to the other coil unit. The electric current per coil unit is lower by providing several parallel coil units. The coil wire of the coil units can therefore have a smaller diameter. The packing density of the coil unit can be increased by providing a smaller coil wire diameter, thereby improving the efficiency of the coil unit.

In an embodiment of the present invention, the claws can, for example, be designed to have a rectangular-shape. A stator body having simple rectangular-shaped claws can be easily manufactured. The electric motor can therefore be manufactured more economically.

The claws can alternatively be designed to have a trapezoidal shape. The smaller side of the two parallel sides of the trapezoidal is the free end of the claw. This free end is oriented to the other stator body. Trapezoidal claws reduce the magnetic interference, thereby improving the efficiency of the electric motor.

In an embodiment of the present invention, the motor rotor can, for example, be a composite part with permanent magnetic particles in a body of non-magnetic substance. The motor rotor can easily be manufactured by injection molding so that the electric motor can be manufactured more economically. The motor rotor can also be manufactured to have various shapes. Because plastic material has a low specific weight, the total weight of the motor rotor can be reduced.

Each stator body can, for example, also comprise three claws.

In an embodiment of the present invention, back iron rings magnetically connecting the claws of the respective stator bodies with each other and the claws can, for example, also be provided at a single cylinder plane. The claws and the back iron rings lie in one cylinder plane. The stator bodies can thus be manufactured without bending the back iron ring away from the claws so that the manufacturing costs can be decreased. The stator has smaller dimensions in the radial direction because the back iron rings are not radially bent to the outside.

In an embodiment of the present invention, the coil core can, for example, be defined by an overlap of the free end portions of the radial arms. The overlapping area is thereby increased, whereby the magnetic connection of the stator bodies with each other is improved. The overlapping end portions can, for example, be in close contact to each other so that the magnetic connection between the stator bodies is further improved. The overlapping end portions are thus arranged air-gap free to each other.

In an embodiment of the present invention, the motor rotor can, for example, overlap in an axial direction only with the claws of the stator bodies. The axial extension of the motor rotor is defined by the back iron rings connecting the claws. The motor rotor does not overlap with the back iron rings. The efficiency of the magnetic field driving the motor rotor is therefore not significantly deteriorated by the back iron rings. The electric motor consequently has a high electric efficiency.

Further advantages will become evident by the following detailed description of an embodiment of the present invention in combination with the drawings.

FIG. 1 shows a perspective view of an automotive single-phase electrical motor 10 of the claw pole type (without a motor rotor) comprising a stator 14 defined by two annular stator bodies 18, 22 made of ferromagnetic stamped-bent-sheet-metal parts. Each stator body 18, 22 is provided with three magnetic rectangular-shaped claws 26 meshing with the same number of claws 26 of the other stator body 18, 22. The rectangular-shaped claws 26 are connected by back iron rings 30. The back iron rings 30 and the claws 26 of each stator body 18, 22 are provided at a single cylinder plane of an imaginary cylinder.

The electric motor 10 further comprises a stator coil arrangement 34 for magnetizing the stator bodies 18, 22. The stator coil arrangement 34 is provided as a satellite with respect to the stator 14, i.e., the stator coil arrangement 34 is provided in a radial distance to the stator 14. The stator coil arrangement 34 is defined by a cuboid coil 38 comprising a plurality of windings 42 of a coil wire 46. An axial axis 50 of the windings 42 is parallel to an axial stator axis 54. The outer circumference of the stator coil arrangement 34 around the axial axis 50 of the windings 42 is smaller than a circumference of the stator body claws 26 around the axial stator axis 54. The stator coil arrangement 34 comprises a rectangular opening 58 extending along the axial axis 50 of the windings 42.

Each stator body 18, 22 comprises a radial arm 62, 66 extending laterally from the stator body 18, 22, the radial arms 62, 66 being fixed at an axial end of the stator bodies 18, 22, respectively. Free end portions 70, 74 of the radial arms 62, 66 of both stator bodies 18, 22 are inserted from opposing sides into the rectangular opening 58 of the stator coil arrangement 34 to define a coil core. The free end portions 70, 74 are arranged so as to overlap in the rectangular opening 58 so that the stator bodies 18, 22 are magnetically connected to each other. Both free end portions 70, 74 are in close contact with each other in the overlapping region.

Figure 2:
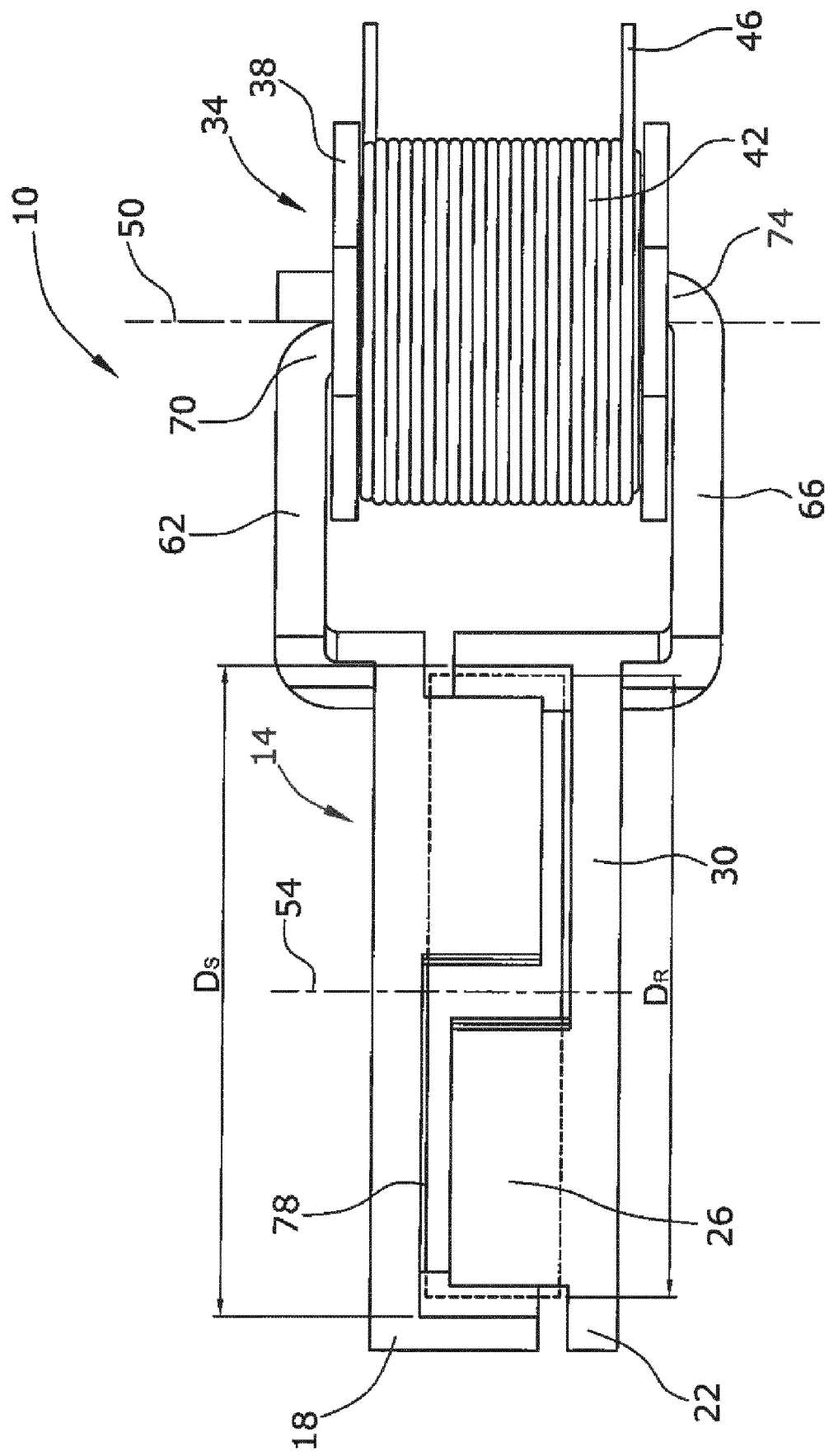
FIG. 2 shows a side view of the electric motor shown in FIG. 1.

FIG. 2 shows the electric motor 10 in a side view. FIG. 2 shows a motor rotor 78 of the electric motor 10. The motor rotor 78 is permanently magnetized and is arranged in a center of the stator bodies 18, 22 to rotate around a rotational axis which is shown as the axial stator axis 54. A motor rotor diameter $D_R$ is slightly smaller than an inner stator body diameter $D_S$. The axial length of the motor rotor 78 is defined by the back iron rings 30 of the stator bodies 18, 22 so that the motor rotor 78 does axially not overlap with the back iron rings 30 of the stator bodies 18, 22. The motor rotor 78 therefore overlaps only with the claws 26 of the stator bodies 18, 22.

The present invention is not limited to embodiments described herein; reference should be had to the appended claims.

LIST OF REFERENCE NUMERALS 10 electric motor
14 stator
18 stator body
22 stator body
26 claw
30 back iron ring
34 stator coil arrangement
38 cuboid coil
42 winding
46 coil wire
50 axial axis
54 axial stator axis/rotating axis
58 rectangular opening
62 radial arm
66 radial arm
70 free end portion
74 free end portion
78 motor rotor
$D_R$ motor rotor diameter
$D_S$ stator body diameter

What is claimed is:

1. An automotive single-phase electrical motor of a claw pole type comprising:
   a motor rotor configured to rotate around a rotating axis;
   a stator defined by a pair of annular stator bodies comprising,
      a first stator body which comprises a radial arm and at least two magnetic claws, and
      a second stator body which comprises a radial arm and at least two magnetic claws,
   wherein,
      the at least two magnetic claws of the first stator body are configured to mesh with the at least two magnetic claws of the second stator body so that the pair of annular stator bodies mate with each other;
   a stator coil arrangement configured to magnetize the pair of annular stator bodies; and
   back iron rings which are configured to magnetically connect the at least two magnetic claws of the pair of annular stator bodies with each other,
   wherein,
      the stator coil arrangement is provided as a satellite of the pair of annular stator bodies,
      the radial arm of the first stator body and the radial arm of the second stator body are magnetically connected to each other at the stator coil arrangement, and
      the back iron rings and the at least two magnetic claws are completely arranged in a single cylinder plane.

2. The automotive single-phase electrical motor as recited in claim 1, wherein the pair of annular stator bodies are provided as stamped-bent-sheet-metal parts.

3. The automotive single-phase electrical motor as recited in claim 1, wherein,
   the stator coil arrangement comprises a circumference,
   the at least two magnetic claws of the pair of annular stator bodies comprises a circumference, and
   the circumference of the stator coil arrangement is smaller than the circumference of the at least two magnetic claws.

4. The automotive single-phase electrical motor as recited in claim 1, wherein the stator coil arrangement comprises a plurality of coil units arranged in parallel.

5. The automotive single-phase electrical motor as recited in claim 1, wherein the at least two magnetic claws of the pair of annular stator bodies are designed to have a rectangular-shape.

6. The automotive single-phase electrical motor as recited in claim 1, wherein the at least two magnetic claws of the pair of annular stator bodies are designed to have a trapezoidal shape.

7. The automotive single-phase electrical motor as recited in claim 1, wherein the motor rotor is a composite part comprising permanent magnetic particles.

8. The automotive single-phase electrical motor as recited in claim 1, wherein each of the first stator body and the second stator body comprises three of the at least two magnetic claws.

9. The automotive single-phase electrical motor as recited in claim 1, wherein an overlap of a free end portion of the radial arm of the first stator body and a free end portion the radial arm of the second stator body define a coil core.

10. The automotive single-phase electrical motor as recited in claim 1, wherein the motor rotor is configured to only overlap in an axial direction with the at least two magnetic claws of the pair of annular stator bodies.

* * * * *